(No Model.)
W. A. STONE.
JOURNAL AND STUFFING BOX.
No. 272,170. Patented Feb. 13, 1883.
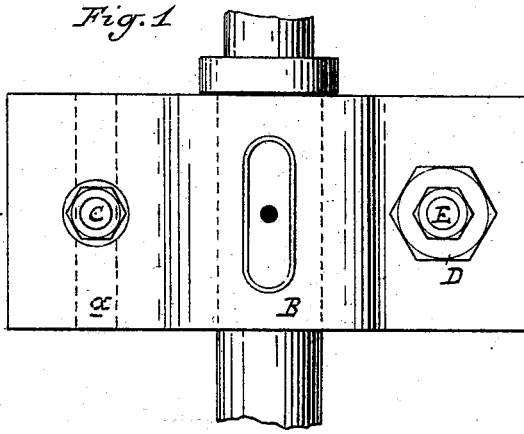
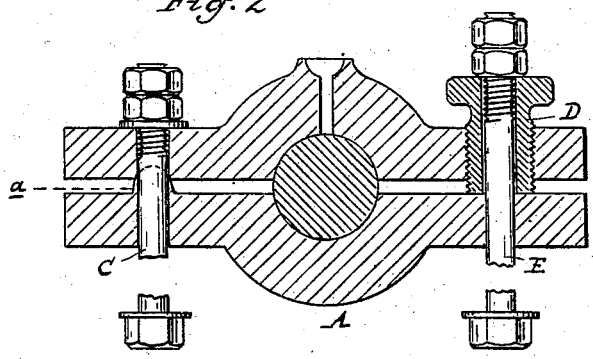
Attest:
A. Barthel
C. Scully
Inventor:
Wm. A. Stone
by his Atty

UNITED STATES PATENT OFFICE.

WILLIAM A. STONE, OF LORAIN, OHIO.

JOURNAL AND STUFFING BOX.

SPECIFICATION forming part of Letters Patent No. 272,170, dated February 13, 1883.

Application filed November 8, 1882. (No model.)

*To all whom it may concern:*

Be it known that I, WILLIAM A. STONE, of Lorain, in the county of Lorain and State of Ohio, have invented new and useful Improvements in Journal and Stuffing Boxes; and I hereby declare that the following is a full, clear, and exact description thereof, reference being had to the accompanying drawings, which form a part of this specification.

The nature of this invention relates to certain new and useful improvements in the construction and operation of journal and stuffing boxes—such as are liable to wear in use and require repacking, or of that class where it may be desirable to adjust more loosely or more tightly to the shaft.

The object of the invention is to construct the box so that the cap may be adjusted to or from the body of the box, as circumstances may require; and the invention consists in the peculiar construction, combination, and operation of the parts, as more fully hereinafter described.

Figure 1 is a plan view of my improved box detached from its hanger or other support, and showing a section of shaft or piston-rod therein. Fig. 2 is a vertical central cross-section.

An ordinary method of accomplishing the result sought to be accomplished by this invention is to make the body of the box and the cap in the usual way, and between the under bearings upon each side of the cap proper to interpose thicknesses of sheet-lead or other material, and more or less of them, as may be required, and then tightening the bolts that hold the parts together. This requires, when any change is desired to be made, the nuts and cap to be removed and other thicknesses of material added, or those already in removed, when the cap is replaced and secured in position again by the nuts.

In the accompanying drawings, which form a part of this specification, A represents the lower half of the box, and B the cap. The lower half is cast with a fulcrum-bar, *a*, extending across one end of the box bearing or flange, and the cap B is cast with a corresponding groove, the groove, when the parts are together, fitting upon the top of the fulcrum and preventing the two coincident flanges from coming in contact upon their inner faces. A bolt, C, passing through these parts, holds them together, and the same bolt may form a part of the means for attaching the whole box to its support, as usual. The opposite ends or flanges of the box are made in the usual way, except that a screw-hole is tapped through the flange of the cap, to engage with the threaded thimble D, through which and a coincident hole in the flange of the lower half of the box a bolt, E, passes, to hold the parts together, and this bolt may also form a part of the means for securing the box to its support, as usual. The thimble, passing through the cap, with its lower end impinging against the upper face of the flange of the lower part of the box, will adjust the required distance between the inner faces of the flanges of the two parts which form the box, and it would be well when such adjustment is made to tighten the nuts on the bolts, to prevent the vibration consequent upon running machinery from changing the position of the thimble by inducing a slight rotation of the same.

Instead of the fulcrum and groove, a like thimble may be employed at the end of the box, where these elements are shown, for the same purpose, without departing from the spirit of my invention, which is to so construct a box that its cap may be adjusted to the different required positions without the necessity of removing any of the nuts from the bolts which hold the parts together.

What I claim as my invention is—

1. In combination with the two parts of a box, as described, a thimble threaded and operating in combination with the cap to adjust the same to any desired position, substantially as described.

2. In a box for the purposes described, the combination upon one of the parts of said box of the fulcrum-bar *a* and the groove upon the coincident part, with means for adjustment upon the opposite end, substantially as and for the purposes specified.

WM. A. STONE.

Witnesses:
 WARREN W. SAMPSELL,
 C. W. PARK.